US012622507B1

(12) United States Patent
Dworakoski

(10) Patent No.: US 12,622,507 B1
(45) Date of Patent: May 12, 2026

(54) DOOR REMOVAL SAFETY SYSTEM

(71) Applicant: Scott Dworakoski, Waconia, MN (US)

(72) Inventor: Scott Dworakoski, Waconia, MN (US)

(*) Notice: Subject to any disclaimer, the term of this patent is extended or adjusted under 35 U.S.C. 154(b) by 59 days.

(21) Appl. No.: 18/636,189

(22) Filed: Apr. 15, 2024

(51) Int. Cl.
*A45F 3/14* (2006.01)
*B60J 5/00* (2006.01)

(52) U.S. Cl.
CPC .................. *A45F 3/14* (2013.01); *B60J 5/00* (2013.01); *A45F 2003/142* (2013.01)

(58) Field of Classification Search
CPC ..................................... A45F 3/14; B66F 5/00
USPC ........................................ 224/101, 257, 258
See application file for complete search history.

(56) References Cited

U.S. PATENT DOCUMENTS

| | | | | | |
|---|---|---|---|---|---|
| 741,098 | A | * | 10/1903 | Bibler | A45C 13/38 224/260 |
| 909,217 | A | * | 1/1909 | Presba | A45F 5/00 224/265 |
| 966,562 | A | * | 8/1910 | Knoerzer | A45F 3/15 224/266 |
| 1,185,698 | A | * | 6/1916 | Robert | A45F 3/14 224/260 |
| 1,727,873 | A | * | 9/1929 | Farmer, Jr. | A45F 3/14 224/260 |
| 1,879,480 | A | * | 9/1932 | Pures | A45F 3/14 224/260 |

| | | | | | |
|---|---|---|---|---|---|
| 2,477,432 | A | * | 7/1949 | Walsh | A45F 5/00 224/260 |
| 2,651,441 | A | * | 9/1953 | Rau | A45F 3/14 224/264 |
| 3,892,385 | A | * | 7/1975 | Andrist | B66F 5/00 254/133 R |
| 5,135,205 | A | * | 8/1992 | Bedard | B66F 9/02 269/71 |
| D330,633 | S | * | 11/1992 | Lavin | D3/221 |
| 5,624,065 | A | * | 4/1997 | Steffe | A45F 5/00 224/625 |
| 5,915,742 | A | * | 6/1999 | Hung | B62D 65/00 29/281.5 |
| 5,961,014 | A | * | 10/1999 | Knerr | A45F 3/04 224/259 |
| 6,024,348 | A | * | 2/2000 | Ventura | B05B 13/0285 269/104 |
| D457,725 | S | * | 5/2002 | Parsons | D3/327 |
| 6,446,849 | B1 | * | 9/2002 | Schleifer | A45F 3/14 294/149 |
| 6,729,511 | B2 | * | 5/2004 | Dent, III | B65G 7/12 224/259 |

(Continued)

*Primary Examiner* — Nathan J Newhouse
*Assistant Examiner* — Lester L Vanterpool
(74) *Attorney, Agent, or Firm* — Cramer Patent & Design, PLLC.; Aaron R. Cramer

(57) ABSTRACT

The door removal safety system may comprise a lifting strap, a pair of lifting hooks, a neck pad, and a spacer. The door removal safety system may be operable as a tool for removing a door from a vehicle having removable doors. The lifting strap may be adapted to be worn by a user on the user's neck such that the pair of lifting hooks hang down in front of the user. The pair of lifting hooks may be adapted to be placed under the bottom of the door while the user squats. The door removal safety system may be adapted to lift the door as the user stands upright while supporting sides of the door with the user's hands.

1 Claim, 4 Drawing Sheets

(56)　　　　References Cited

U.S. PATENT DOCUMENTS

| | | | | |
|---|---|---|---|---|
| 6,790,201 B2 * | 9/2004 | Meyer | A61M 25/02 | |
| | | | | 604/179 |
| 7,008,166 B1 * | 3/2006 | Grimes | B66C 23/48 | |
| | | | | 254/114 |
| 7,275,670 B1 * | 10/2007 | Shumack | B60R 9/06 | |
| | | | | 224/518 |
| 7,942,294 B2 * | 5/2011 | Burton | A45F 3/14 | |
| | | | | 224/257 |
| 8,328,173 B1 | 12/2012 | DesForge et al. | | |
| 8,657,166 B1 * | 2/2014 | Harness | A45F 3/14 | |
| | | | | 224/259 |
| 9,585,463 B2 * | 3/2017 | Lourie | A45F 3/14 | |
| 10,035,463 B1 * | 7/2018 | Salter | B60R 5/04 | |
| 10,150,420 B2 * | 12/2018 | Stojkovic | B60J 5/047 | |
| 10,154,724 B2 * | 12/2018 | Boino | A45F 5/00 | |
| 10,160,627 B1 * | 12/2018 | Robertson | B62B 5/06 | |
| 10,202,024 B2 | 2/2019 | Rao et al. | | |
| 10,407,087 B1 | 9/2019 | Baker et al. | | |
| 10,619,391 B2 | 4/2020 | Yoo et al. | | |
| D907,857 S * | 1/2021 | Nielsen | A45F 5/00 | |
| | | | | D29/101.1 |
| 11,013,653 B1 * | 5/2021 | Atkins | A61G 7/104 | |
| 11,603,151 B2 * | 3/2023 | Brown | B62D 65/06 | |
| 12,084,001 B2 * | 9/2024 | Smith | B60R 9/06 | |
| 2005/0211740 A1 * | 9/2005 | Sekulic | B62B 5/068 | |
| | | | | 224/258 |
| 2006/0011684 A1 * | 1/2006 | Wills | B60R 9/06 | |
| | | | | 224/512 |
| 2006/0065688 A1 * | 3/2006 | Hasz | B60R 9/06 | |
| | | | | 224/521 |
| 2006/0289578 A1 * | 12/2006 | Beyes | B60R 11/00 | |
| | | | | 224/488 |
| 2008/0156834 A1 * | 7/2008 | Tipaldo | A45F 3/14 | |
| | | | | 224/257 |
| 2011/0049203 A1 * | 3/2011 | Stark | A45C 13/38 | |
| | | | | 224/268 |
| 2012/0000947 A1 * | 1/2012 | Ashley | A45F 3/14 | |
| | | | | 224/257 |
| 2013/0056508 A1 * | 3/2013 | Ahearn | A45F 3/14 | |
| | | | | 224/260 |
| 2014/0084038 A1 * | 3/2014 | Moles | A45F 5/00 | |
| | | | | 224/607 |
| 2022/0395081 A1 * | 12/2022 | Nemeth | A45F 3/14 | |

* cited by examiner

100

230

206

200

212

214

950

100

100

DOOR REMOVAL SAFETY SYSTEM

RELATED APPLICATIONS

None.

FIELD OF THE DEVICE

The present device pertains to automotive tools and specifically to systems and methods for safely removing doors from vehicles. It relates more particularly to a device that facilitates the removal of doors from vehicles with removable doors, such as off-road vehicles, jeeps, and certain types of sports and utility vehicles, without the need for additional manual labor or lifting equipment.

BACKGROUND OF THE DEVICE

The removal of doors from vehicles, especially those designed for off-road or versatile use, is a common practice for vehicle owners seeking to enhance their driving experience or perform maintenance. Traditional methods of door removal often require physical strength and can pose a risk of injury to the user or damage to the vehicle due to the awkward and heavy nature of the doors. Additionally, conventional tools and methods for door removal do not always provide adequate support or stability, making the process cumbersome and potentially unsafe. There exists a need for an improved system that addresses these issues by providing a user-friendly, efficient, and safer means of removing and reattaching vehicle doors. The present invention seeks to fulfill this need and also to offer further related advantages.

SUMMARY OF THE DEVICE

Embodiments of the present disclosure may encompass a door removal safety system that includes a lifting strap designed to be worn around the user's neck. This lifting strap comprises a left lifting strap segment, a right lifting strap segment, and a neck strap segment that connects the left and right segments.

Embodiments of this disclosure may also incorporate a pair of lifting hooks. Each hook is designed to be detachably coupled to the end of each lifting strap segment. These hooks are specifically shaped to engage with the bottom edge of a door on a vehicle that features removable doors.

Further, some embodiments include a neck pad aimed at providing cushioning for the user's neck. This neck pad is designed so that the neck strap segment of the lifting strap can pass through it, enhancing user comfort. Additionally, a spacer is included in certain embodiments to ensure a specific spacing between the left and right lifting strap segments. This spacing aids in stabilizing the hooks' engagement with the door's bottom edge, facilitating safer and more secure door removal.

The lifting strap can be made from a variety of flexible materials, including but not limited to polyester, nylon, polypropylene, aromatic polyamides, canvas, and leather. This selection allows for durability and user comfort.

In detail, each lifting hook in some embodiments features a backplate and an upward bend, creating a hook trough. This trough engages with the bottom edge of the door, while the backplate includes several length adjustment slots. These slots allow for the hook's height adjustment relative to the ground, accommodating doors of different sizes and configurations.

Regarding the spacer, it includes a stiffener that determines the spacing between the left and right lifting strap segments. Couplers are attached to both sides of the stiffener, designed to hold each lifting strap segment in place, thus maintaining the necessary spacing for door removal stability.

Moreover, the disclosure outlines a method for using the door removal safety system. This method involves preparatory steps such as lowering the door's window, removing hinge screws, and disconnecting any electrical cables and the door check. The user then positions the lifting hooks beneath the door, stands up to engage the hooks, and lifts the door away from the vehicle. The method also covers the storage of the removed door and its re-installation, providing a comprehensive approach to door removal and replacement tasks.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
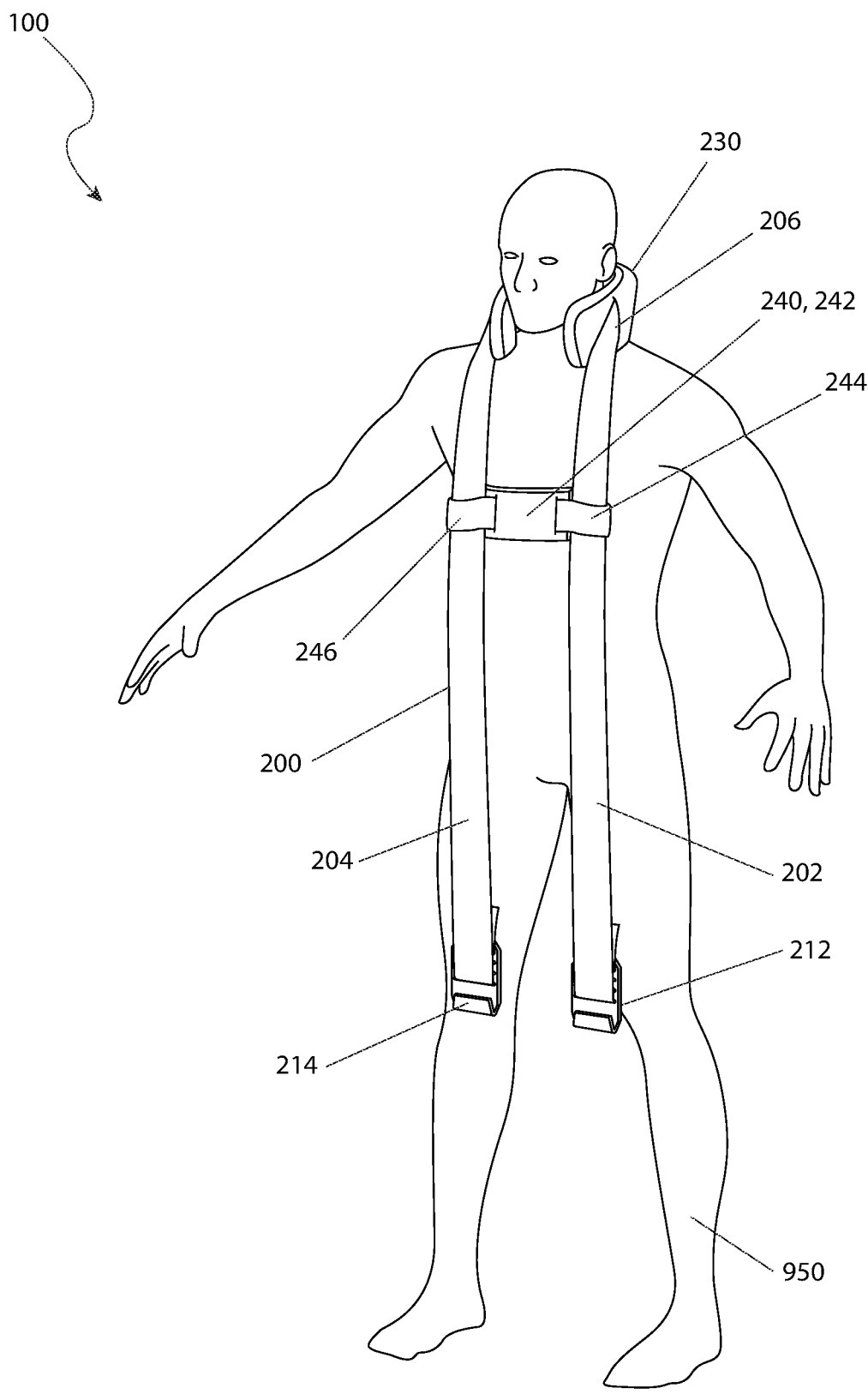
FIG. 1 is a front isometric view of a door removal safety system 100, according to an embodiment of the present invention.
Figure 2:
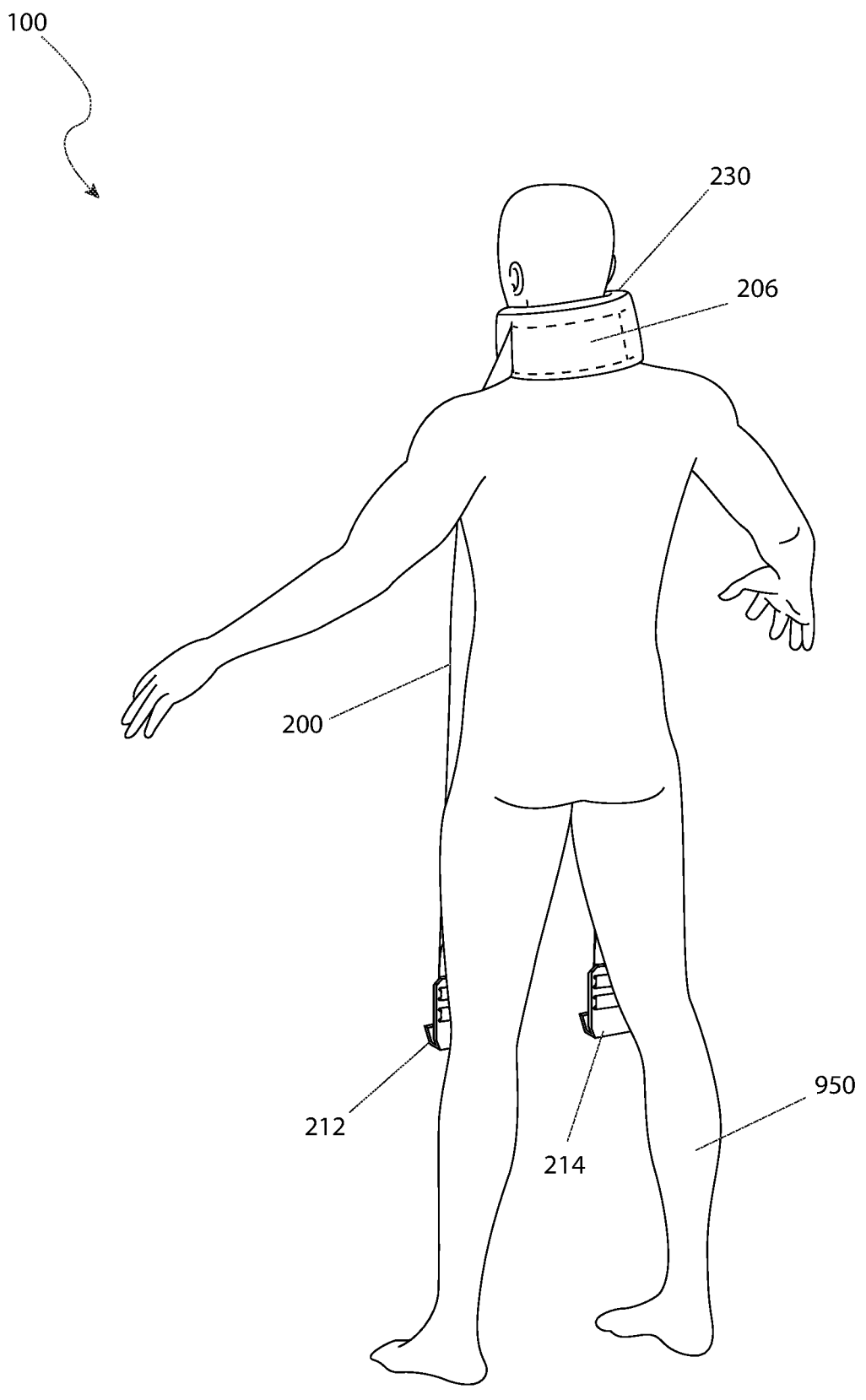
FIG. 2 is a rear isometric view of a door removal safety system 100, according to an embodiment of the present invention.
Figure 3:
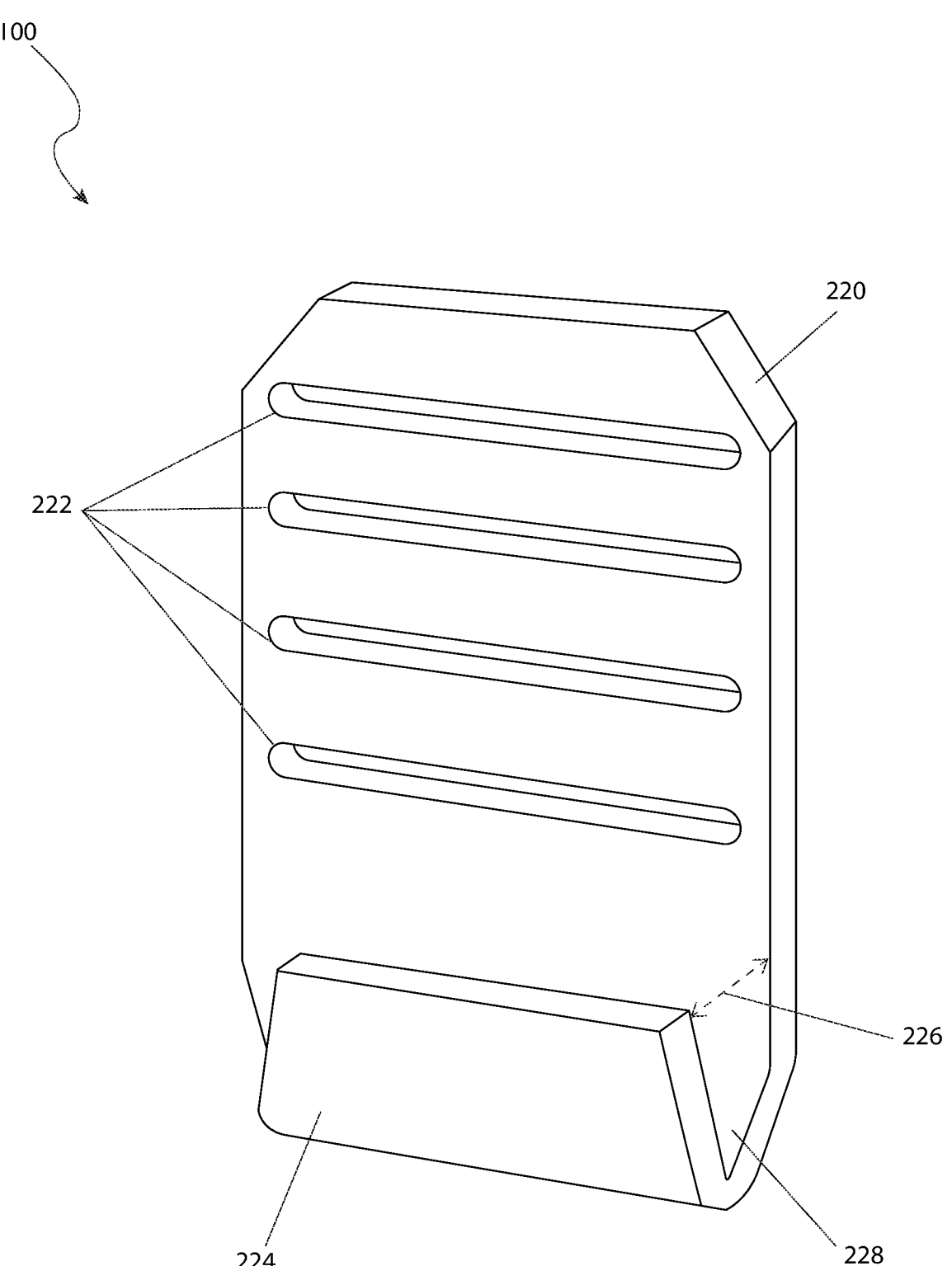
FIG. 3 is a detail view of a door removal safety system 100, according to an embodiment of the present invention, illustrating an individual lifting hook; and, FIG. 4 is an in-use view of a door removal safety system 100, according to an embodiment of the present invention, illustrating a door 910 supported by the left lifting hook 212, the right lifting hook 214, and the user's hands.
Figure 4:
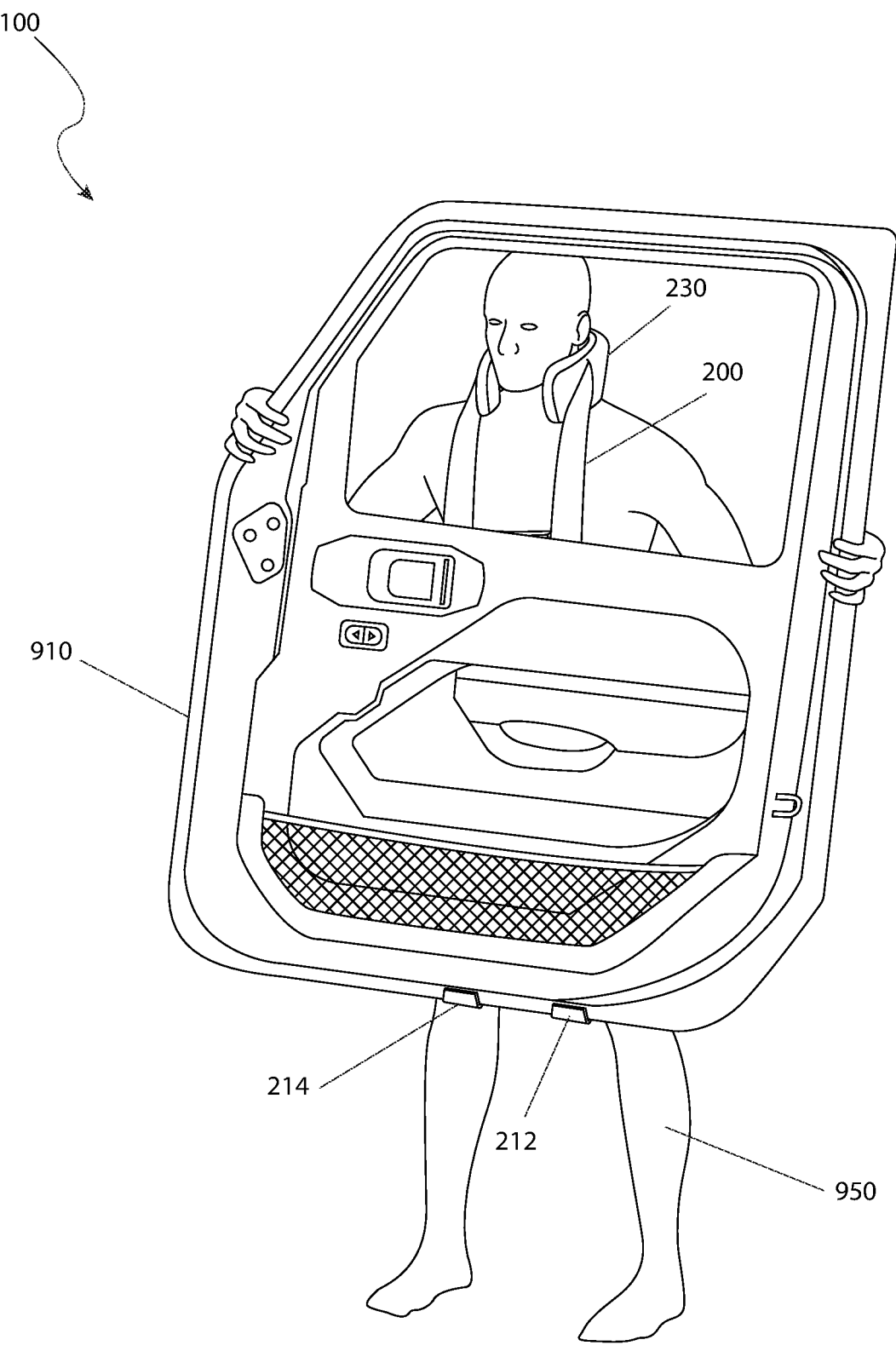

100 door removal safety system
200 lifting strap
202 left lifting strap
204 right lifting strap
206 neck strap
212 left lifting hook
214 right lifting hook
220 backplate
222 length adjustment slot
224 upward bend
226 gap
228 hook trough
230 neck pad
240 spacer
242 stiffener
244 left strap coupler
246 right strap coupler
910 door
950 user

DESCRIPTION OF THE INVENTION

The present invention is directed to a door removal safety system (herein described as the "invention") 100. The invention 100 may comprise a lifting strap 200, a pair of lifting hooks 212, 214, a neck pad 230, and a spacer 240. The invention 100 may be operable as a tool for removing a door 910 from a vehicle having removable doors. The lifting strap 200 may be adapted to be worn by a user 950 on the user's neck such that the pair of lifting hooks 212, 214 hang down in front of the user 950. The pair of lifting hooks 212, 214 may be adapted to be placed under the bottom of the door 910 while the user 950 squats. The invention 100 may be adapted to lift the door 910 as the user 950 stands upright while supporting sides of the door 910 with the user's hands.

The lifting strap 200 may be a strip of flexible material. The lifting strap 200 may be formed into a U-shape and may be regarded as three (3) segments: a left lifting strap 202, a right lifting strap 204, and a neck strap 206. The left lifting strap 202 and the right lifting strap 204 may be adapted to rest on the user's shoulders and may hang in front of the user 950. The neck strap 206 may be the center of the lifting strap 200 and may join the left lifting strap 202 and the right lifting strap 204. The neck strap 206 may be adapted to press against the back of the user's neck. As non-limiting examples, the lifting strap 200 may be made of polyester, nylon, polypropylene, aromatic polyamides, canvas, leather, or any combination thereof.

The pair of lifting hooks 212, 214 may be coupled to the bottom ends of the lifting strap 200. Specifically, a left lifting hook 212 may be coupled to the bottom of the left lifting strap 202 and a right lifting hook 214 may be coupled to the bottom of the right lifting strap 204. The pair of lifting hooks 212, 214 may be configured to detachably couple to the bottom edge of the door 910 such that the door 910 may be lifted as the lifting strap 200 is pulled upwards. An individual lifting hook 212, 214 may be repositionable along an individual strap 202, 204 such that the height of the individual lifting hook above the ground may be adjusted.

The individual lifting hook 212, 214 may comprise a backplate 220 and an upward bend 224. The individual lifting hook 212, 214 may be a flat hook meaning that the individual lifting hook 212, 214 has width such that the upward bend 224 creates a hook trough 228 at the bottom of the individual lifting hook 212, 214. The hook trough 228 may be formed by a gap 226 created between the backplate 220 and the upward bend 224. The individual lifting hook 212, 214 may be coupled to the individual strap 202, 204 such that the upward bend 224 is adapted to point forward and up, away from the user 950.

The backplate 220 may comprise length adjustment slots 222. The length adjustment slots 222 may comprise a plurality of horizontal apertures that may be equally spaced one (1) above the other and passing through the backplate 220 from front to rear. The individual strap 202, 204 may pass vertically through the length adjustment slots 222 multiple times such that the length adjustment slots 222 retain the individual lifting hook 212, 214 on the individual strap 202, 204 at a fixed position while permitting a height adjustment to be performed as necessary. The height adjustment may be performed by loosening the individual strap 202, 204 such that the individual strap 202, 204 may slide through the length adjustment slots 222 in order to reposition the individual lifting hook 212, 214. The individual strap 202, 204 may be tightened again upon completion of the height adjustment.

The neck pad 230 may be adapted to cushion the user's neck. The lifting strap 200 may be adapted to pass through the neck pad 230 such that at least a portion of the neck pad 230 is positioned between the neck strap 206 segment of the lifting strap 200 and the user's neck. As a non-limiting example, the neck pad 230 may be made of natural or synthetic rubber.

The spacer 240 may be operable to maintain a spacing between the left lifting strap 202 and the right lifting strap 204 such that the left lifting hook 212 and the right lifting hook 214 may be separated at the bottom of the door 910 thus increasing the stability of lifting the door 910. The spacer 240 may comprise a stiffener 242, a left strap coupler 244, and a right strap coupler 246. The stiffener 242 may be a rigid or semi-rigid panel having a width that defines the separation distance between the left lifting strap 202 and the right lifting strap 204. The left strap coupler 244 may be coupled to the left side of the stiffener 242 and the right strap coupler 246 may be coupled to the right side of the stiffener 242. The left strap coupler 244 may comprise a loop that the left lifting strap 202 may pass through. The right strap coupler 246 may comprise a loop that the right lifting strap 204 may pass through. In some embodiments, the position of the spacer 240 may be changed by decoupling the left strap coupler 244 and the right strap coupler 246, moving the spacer 240 up or down, and re-coupling the left strap coupler 244 and the right strap coupler 246.

In use, the lifting strap 200 may be donned by the user 950 by placing the lifting strap 200 over the user's head such that the neck strap 206 is positioned behind the user's neck, the left lifting strap 202 and the right lifting strap 204 pass over the user's shoulders and hang down in front of the user 950, and the left lifting hook 212 and the right lifting hook 214 project forward, away from the user 950.

All of the following steps apply to the door 910 to be removed. The window should be lowered in order to provide as many grasping points on the top half of the door 910 as possible. Door hinge screws should be removed from door hinges. An electrical cable leading into the door 910 may be decoupled from the vehicle. The door check, a mechanism that prevents the door 910 from slamming closed, may be decoupled from the vehicle. The door 910 may be pivoted to an open position such that the door 910 is clear of the frame of the vehicle. The user 950 may stand on the outside of the door 910 and squat such that the pair of lifting hooks 212, 214 are lowered to a height that is below the bottom of the door 910. The user 950 may position the pair of lifting hooks 212, 214 under the door 910 and slowly stand such that the pair of lifting hooks 212, 214 engage the bottom of the door 910. The user's hands may grasp the top half of the door 910 on opposites sides of the door 910. The user 950 may stand, lifting the door 910 with the pair of lifting hooks 212, 214 and the user's hands such that door pins separate from the door hinges. The doors 910 may be stored while the vehicle is operated with the doors 910 removed. The doors 910 may be re-installed by reversing the above steps.

The exact specifications, materials used, and method of use of the invention 100 may vary upon manufacturing. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A door-removal safety system comprising:
   a lifting strap configured to be worn over a neck and shoulders of a user, the lifting strap comprising a left lifting strap segment, a right lifting strap segment, and a neck strap segment joining the left and right lifting strap segments in a generally U-shaped configuration;

a pair of lifting hooks respectively and detachably coupled to distal ends of the left and right lifting strap segments, each lifting hook comprising:

a planar backplate having a plurality of horizontally spaced length-adjustment slots through which the corresponding lifting-strap segment is looped to permit selective vertical repositioning of the lifting hook relative to the strap segment; and, an upwardly-curved bend formed integrally with a lower edge of the backplate to define a hook trough dimensioned to receive and support a bottom edge flange of a vehicle door having removable hinges; and, a neck pad positioned along the neck strap segment and configured to cushion contact between the neck strap segment and the neck of the user, the neck strap segment passing slidably through the neck pad; and, a spacer assembly positioned below the neck pad and above the pair of lifting hooks, the spacer assembly comprising:

a stiffener plate extending laterally between the left and right lifting strap segments to define a fixed separation distance corresponding to the hinge spacing of the vehicle door, a left strap coupler attached to a left side of the stiffener plate and a right strap coupler attached to a right side of the stiffener plate, each coupler forming an encircling loop that slidably receives the corresponding lifting-strap segment while laterally constraining the segment to prevent crossover or twisting; and, a plurality of vertically spaced coupler positions on each side of the stiffener plate enabling the spacer assembly to be selectively positioned along the lifting-strap segments to accommodate doors of differing heights; and, wherein the stiffener plate maintains the separation distance between the left and right lifting strap segments under an asymmetric door load so that the lifting hooks remain aligned beneath opposing corners of the door during lifting;

wherein the cooperative relationship among the stiffener plate, the plurality of adjustment slots in each lifting hook, and the neck pad stabilizes the vertical and lateral orientation of the door throughout removal and reinstallation, preventing roll, tilt, or torsional movement of the door relative to the user; and, wherein the system is operable by a single user standing upright after squatting to engage the lifting hooks beneath the door, such that upward movement of the lifting strap transfers load through the stiffener plate and neck pad to the user's shoulders, permitting controlled detachment of the door from vehicle hinges without auxiliary lifting equipment.

*    *    *    *    *